United States Patent
Sakamoto et al.

(10) Patent No.: US 11,569,709 B2
(45) Date of Patent: Jan. 31, 2023

(54) MOTOR DRIVE DEVICE AND SERVO ADJUSTMENT METHOD

(71) Applicant: Panasonic Intellectual Property Management Co., Ltd., Osaka (JP)

(72) Inventors: Yuya Sakamoto, Tokyo (JP); Ken'ichi Suzuki, Osaka (JP); Hiroshi Fujiwara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/056,134

(22) PCT Filed: May 17, 2019

(86) PCT No.: PCT/JP2019/019703
§ 371 (c)(1),
(2) Date: Nov. 17, 2020

(87) PCT Pub. No.: WO2019/239791
PCT Pub. Date: Dec. 19, 2019

(65) Prior Publication Data
US 2021/0218313 A1 Jul. 15, 2021

(30) Foreign Application Priority Data
Jun. 15, 2018 (JP) .............................. JP2018-114666

(51) Int. Cl.
*H02K 5/24* (2006.01)
*H02P 21/05* (2006.01)
(Continued)

(52) U.S. Cl.
CPC ............... *H02K 5/24* (2013.01); *H02P 21/05* (2013.01); *H02P 21/18* (2016.02); *H02P 21/20* (2016.02)

(58) Field of Classification Search
CPC .......... H02P 21/05; H02P 21/18; H02P 21/20
See application file for complete search history.

(56) References Cited

U.S. PATENT DOCUMENTS

| 6,515,442 B1* | 2/2003 | Okubo .................. G05B 19/19 318/632 |
| 2013/0234642 A1* | 9/2013 | Igarashi ............. H02P 23/0004 318/611 |

(Continued)

FOREIGN PATENT DOCUMENTS

| JP | 2008-199759 A | 8/2008 |
| JP | 2009-33783 A | 2/2009 |

(Continued)

OTHER PUBLICATIONS

Extended (Supplementary) European Search Report dated Jul. 6, 2021, issued in counterpart EP Application No. 19819829.3. (7 pages).

(Continued)

*Primary Examiner* — Muhammad S Islam
*Assistant Examiner* — Bradley R Brown
(74) *Attorney, Agent, or Firm* — WHDA, LLP

(57) ABSTRACT

A motor drive device includes: a position command generator which generates a position command; a damping filter unit which includes one or more stages of damping filters which reduce vibration of a device including a load and a motor, applies, to a position command, a damping filter determined based on a model parameter corresponding to a model of the device, and outputs a filtered position command to which the damping filter has been applied; a servo controller which gives a torque command to the motor based on the filtered position command; a low-pass filter unit; a parameter estimation unit which estimates the model parameter from the rotational speed and the torque command of the motor which have passed through the low-pass filter unit;

(Continued)

and a vibration determination unit which determines presence or absence of vibration in the model.

8 Claims, 7 Drawing Sheets

(51) Int. Cl.
*H02P 21/18* (2016.01)
*H02P 21/20* (2016.01)

(56) References Cited

U.S. PATENT DOCUMENTS

| | | | |
|---|---|---|---|
| 2015/0084572 | A1 | 3/2015 | Tanaka |
| 2016/0291551 | A1* | 10/2016 | Ishii ........................ G05B 5/01 |
| 2016/0313721 | A1 | 10/2016 | Tazawa et al. |
| 2016/0327932 | A1 | 11/2016 | Shinohara et al. |

FOREIGN PATENT DOCUMENTS

| | | |
|---|---|---|
| JP | 2009-81985 A | 4/2009 |
| JP | 2009-303432 A | 12/2009 |
| JP | 2010-136504 A | 6/2010 |
| JP | 2014-149406 A | 8/2014 |
| WO | 2008/053772 A1 | 5/2008 |
| WO | 2013/171875 A1 | 11/2013 |
| WO | 2015/111298 A1 | 7/2015 |
| WO | 2015/129207 A1 | 9/2015 |

OTHER PUBLICATIONS

International Search Report w/English translation and Written Opinion in Japanese dated Aug. 13, 2019, issued in counterpart International Application No. PCT/JP2019/019703 (6 pages).

* cited by examiner

MOTOR DRIVE DEVICE AND SERVO ADJUSTMENT METHOD

TECHNICAL FIELD

The present disclosure relates to a motor drive device and a servo adjustment method.

BACKGROUND ART

A conventional motor drive device has a basic function, such as position, speed, and electric current control for driving a servo motor according to an external command. In addition, a technique has been proposed in which a function called a damping filter which removes vibration of a device as a load to be driven is mounted in a motor drive device (for example, Patent Literature (PTL) 1). The damping filter disclosed in PTL 1 removes the vibration based on model parameters, such as the resonance frequency, antiresonance frequency, and inertia of the device as the load. In order for such a damping filter to precisely function, each model parameter of the motor drive device has to be accurately estimated.

As the techniques related to this type of model parameter estimation method, for example, the techniques disclosed in PTL 2 and PTL 3 are known. PTL 2 discloses a technique in which a torque command including a number of frequency components is given to a motor control device, frequency characteristics are generated from the torque command and the actual motor speed, and model parameters of a device as a load are estimated based on the frequency characteristics.

PTL 3 discloses a technique in which a torque command and a motor rotational speed are measured in a state where a device as a load is performing a normal positioning operation, and model parameters are estimated based on the data.

CITATION LIST

Patent Literature

[PTL 1] Japanese Unexamined Patent Application Publication No. 2010-136504
[PTL 2] Japanese Unexamined Patent Application Publication No. 2008-199759
[PTL 3] Japanese Unexamined Patent Application Publication No. 2009-81985

SUMMARY OF THE INVENTION

Technical Problems

However, the techniques described above have the following problems.

In the technique disclosed in PTL 2, since a torque command including various frequency components is given, a large load is applied to the device as a load. In addition, for example, when a positioning device is used as the device as a load, the model parameters are not estimated by an actual positioning operation. Hence, it is not possible to determine whether or not a damping filter is necessary in an actual operation. For example, even when vibration occurs as a device characteristic, vibration sometimes does not occur in the actual positioning operation. In such a case, the above technique cannot be used.

In the technique disclosed in PTL 3, model parameters are estimated assuming that a device as a load is a two-inertia system, and whether or not the model is a rigid-body model cannot be determined. Therefore, even when a rigid-body model device which does not require a damping filter is to be operated, the damping filter is unnecessarily applied to the device, resulting in a reduction in positioning speed. Even when a multi-inertia system device is to be operated, the number of stages of damping filters to be applied differs depending on, for example, whether the device is a two-inertia system or a three-inertia system. When the model of the device is unknown, the number of stages of damping filters to be applied cannot be determined. Hence, the damping filter for the wrong model could possibly be applied.

The present disclosure is to solve these problems. An object of the present disclosure is to provide a motor drive device and a servo adjustment method which are capable of determining the number of stages of damping filters necessary for the model of a device including a load and a motor and causing the damping filters to precisely function.

Solutions to Problems

In order to solve the above problems, one aspect of the motor drive device according to the present disclosure is a motor drive device which drives a motor to which a load is connected. The motor drive device includes: a position command generator which generates a position command corresponding to a target position of the motor; a damping filter unit which includes one or more stages of damping filters, the damping filter unit applying, to the position command, a damping filter determined from among the one or more stages of the damping filters based on a model parameter corresponding to a model of a device including the load and the motor, and outputting a filtered position command to which the damping filter has been applied, the one or more stages of the damping filters reducing vibration of the device; a servo controller which gives a torque command to the motor based on the filtered position command; a low-pass filter unit which removes a frequency component higher than or equal to a predetermined cutoff frequency; a parameter estimation unit which estimates the model parameter from a rotational speed of the motor and the torque command which have passed through the low-pass filter unit; and a vibration determination unit which determines presence or absence of vibration in the device.

With this, model parameters corresponding to the model of the device including the load and the motor can be estimated. Moreover, by using the estimated model parameters and the torque command to determine the presence or absence of vibration, the number of stages of damping filters necessary for the model can be determined. Moreover, the model parameters can be accurately estimated by the low-pass filter unit removing the high-frequency components of the signal input to the parameter estimation unit. Additionally, use of the model parameters accurately estimated allows the damping filters to precisely function.

Moreover, in order to solve the problems, one aspect of the servo adjustment method according to the present disclosure is a servo adjustment method performed by a motor drive device which drives a motor to which a load is connected. The motor drive device includes: a position command generator which generates a position command corresponding to a target position of the motor; a damping filter unit which includes one or more stages of damping filters, the damping filter unit applying, to the position command, a damping filter determined from among the one or more stages of the damping filters based on a model parameter corresponding to a model of a device including the load and the motor, and outputting a filtered position command to which the damping filter has been applied, the one or more stages of the damping filters reducing vibration of the device; and a servo controller which gives a torque command to the motor based on the filtered position command. The servo adjustment method includes: positioning the load based on the position command generated by the position command generator, when i stage of damping filter among the one or more stages of the damping filters is set, i being greater than or equal to 0; estimating the model parameter from a rotational speed of the motor and the torque command to which a low-pass filter has been applied, assuming that the model is a two-inertia system; determining presence or absence of a vibration component of an (i+1)th inertia system in the model; and activating an (i+1)th stage damping filter and setting the model parameter estimated, when the vibration component of the (i+1)th inertia system has been determined to be present in the determining. The estimating, the determining, and the setting are repeated till the vibration component is determined to be absent in the determining.

With this, model parameters corresponding to the model of the device including a load and a motor can be estimated. Moreover, by using the estimated model parameters and the torque command to determine the presence or absence of vibration, the number of stages of damping filters necessary for the model can be determined. Moreover, by applying a low-pass filter to remove the high-frequency components of the motor rotational speed and the torque command, the model parameters can be accurately estimated. Additionally, use of the model parameters accurately estimated allows the damping filters to precisely function.

Advantageous Effects of Invention

The present disclosure provides a motor drive device and a servo adjustment method which are capable of determining the number of stages of damping filters necessary for the model of a device including a load and a motor, and causing the damping filters to precisely function.

DESCRIPTION OF EXEMPLARY EMBODIMENT

Figure 1:
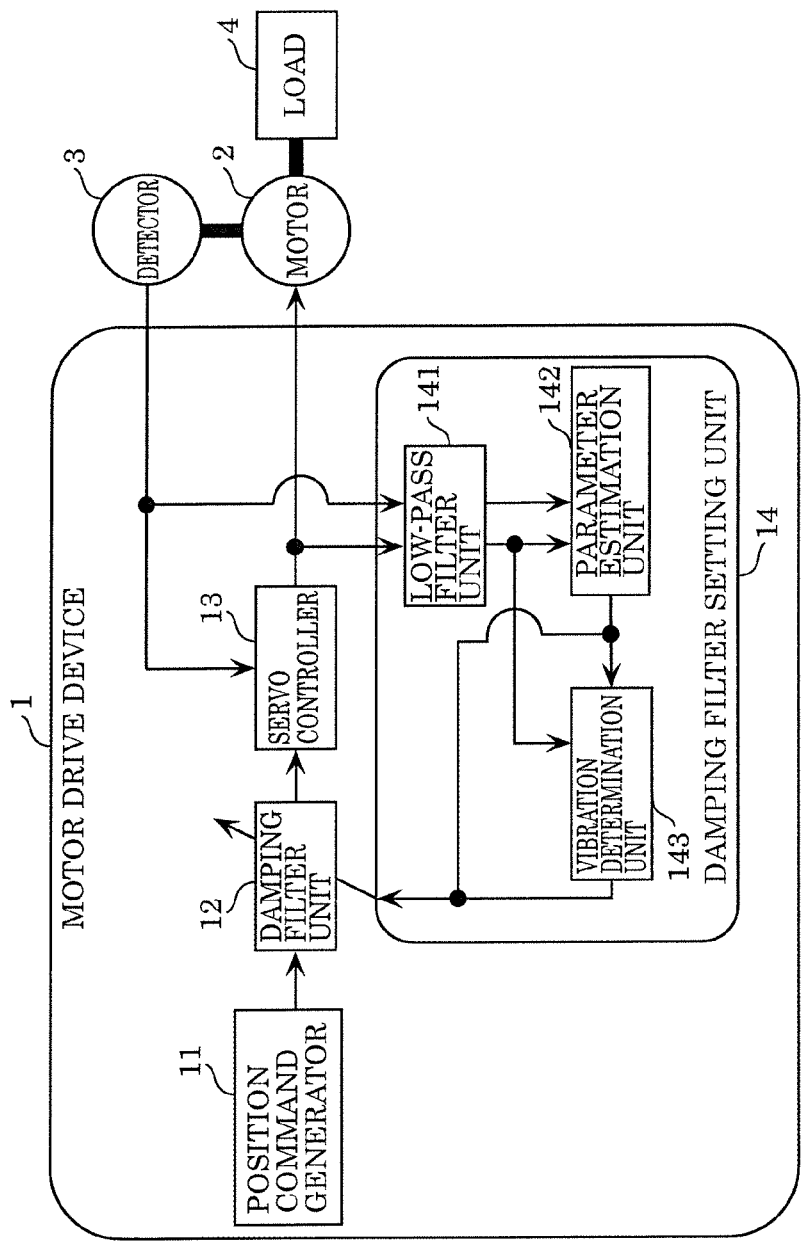
FIG. 1 is a block diagram of a configuration of a motor drive device according to an embodiment.

Hereinafter, an embodiment of the present disclosure will be described in detail with reference to the drawings. Note that the embodiment described below shows a specific example of the present disclosure. Numerical values, shapes, structural elements, arrangement positions and connection forms of the structural elements, steps, order of steps, and the like indicated in the embodiment below are merely examples, and are not intended to limit the present disclosure. In addition, among the structural elements in the embodiment below, structural elements that are not described in independent claims indicating the highest concept of the present disclosure are described as optional structural elements. Note that the drawings are not necessarily precise illustrations. Like reference signs indicate like elements in the drawings, and overlapping descriptions thereof are omitted or simplified.

EMBODIMENT

A motor drive device according to an embodiment will be described with reference to FIG. 1. FIG. 1 is a block diagram of a configuration example of motor drive device 1 according to the present embodiment. FIG. 1 also illustrates motor 2, detector 3, and load 4 in addition to motor drive device 1.

Motor 2 is an electric motor driven by motor drive device 1. Load 4 is connected to motor 2.

Detector 3 is a measuring device which detects the rotational speed of motor 2. For example, an encoder can be used as detector 3.

Load 4 is a device connected to motor 2. In the present embodiment, load 4 is a device on which a positioning operation is performed by motor drive device 1. As load 4, for example, an industrial apparatus, such as a semiconductor manufacturing apparatus or a machine tool, can be used.

Motor drive device 1 is a drive device which drives motor 2 to which load 4 is connected. As illustrated in FIG. 1, motor drive device 1 functionally includes position command generator 11, damping filter unit 12, servo controller 13, and damping filter setting unit 14.

Position command generator 11 generates a position command corresponding to the target position of motor 2. In the present embodiment, position command generator 11 generates a position command based on a specified positioning operation, and outputs the position command to damping filter unit 12. The positioning operation may be specified from the outside of motor drive device 1, or may be specified from within motor drive device 1.

Damping filter unit 12 applies, to the position command input from position command generator 11, a filter processed so as to reduce vibration of a device based on the model parameters, and outputs a filtered position command to which the filter has been applied. Here, damping filter unit 12 will be described with reference to FIG. 2.

Figure 2:
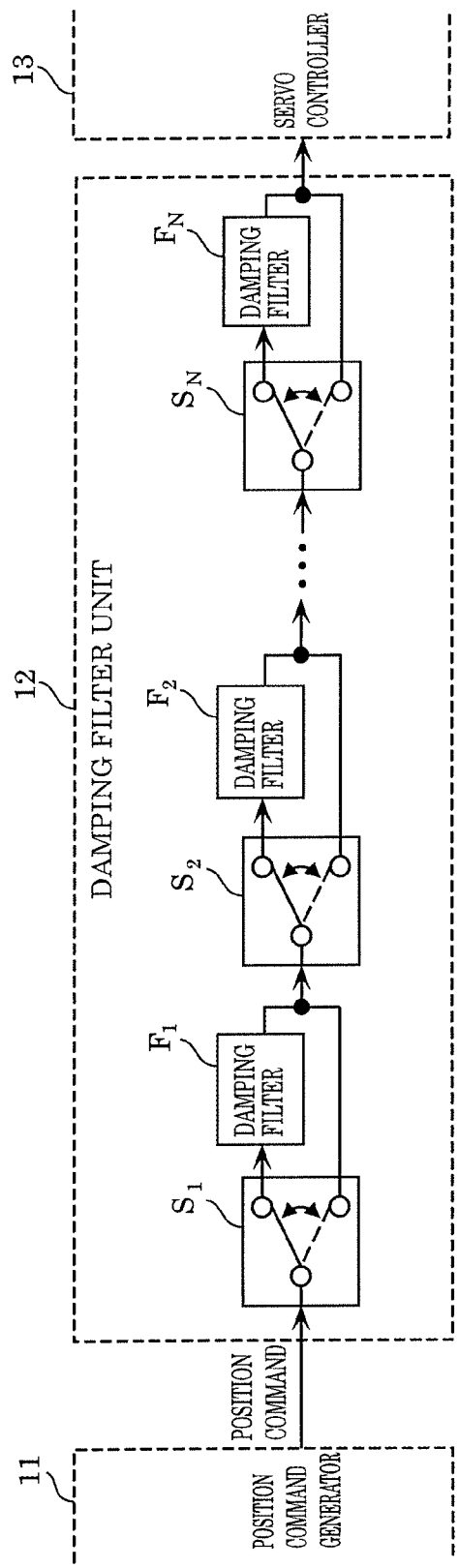
FIG. 2 is a block diagram of a configuration of a damping filter of the motor drive device according to the embodiment.

FIG. 2 is a block diagram of a configuration of damping filter unit 12 of motor drive device 1 according to the present embodiment. FIG. 2 also illustrates position command generator 11 and servo controller 13. As illustrated in FIG. 2, damping filter unit 12 includes one or more stages of damping filters which reduce the vibration of a device including load 4 and motor 2. In the present embodiment, damping filter unit 12 includes N stages (N≥1) of damping filters $F_1$ to $F_N$.

As illustrated in FIG. 2, damping filter unit 12 includes damping filter switching unit $S_1$ to $S_N$, which are respectively arranged prior to the N stages of damping filters $F_1$ to $F_N$, to switch between activation and deactivation of the corresponding damping filters. With the above configuration, damping filter unit 12 applies, to the position command, the damping filter determined based on the model parameters corresponding to the model of the device including load 4 and motor 2 from among one or more stages of damping filters, and outputs a filtered position command to which the damping filter has been applied.

In the example illustrated in FIG. 1, damping filter setting unit 14 is disposed inside motor drive device 1, but may be disposed outside motor drive device 1.

Servo controller 13 gives a torque command to motor 2 based on the filtered position command output from damping filter unit 12. Servo controller 13 generates a torque command to be given to motor 2 from the filtered position command output from damping filter unit 12 and the rotational position indicated by detector 3.

Damping filter setting unit 14 includes low-pass filter unit 141, parameter estimation unit 142, and vibration determination unit 143. Low-pass filter unit 141 is a filter which removes the frequency components higher than or equal to a predetermined cutoff frequency. Low-pass filter unit 141 generates the low-pass filtered rotational speed of motor 2 and the low-pass filtered torque command by removing the high frequency components from the rotational speed of motor 2 calculated from the rotational position of motor 2 detected by detector 3, and the torque command.

Parameter estimation unit 142 estimates model parameters from the rotational speed of motor 2 and the torque command which have passed through low-pass filter unit 141. Parameter estimation unit 142 has a function of estimating the total inertia, the resonance frequency, the resonance damping ratio, the antiresonance frequency, and the resonance damping ratio, assuming that the model of the device including load 4 and motor 2 is a two-inertia system.

Vibration determination unit 143 determines the presence or absence of vibration in the model of the device including load 4 and motor 2. In the present embodiment, vibration determination unit 143 determines the presence or absence of vibration of load 4 at the time of the positioning operation from the torque command and the resonance frequency, the antiresonance frequency, and the intermediate torque generated by parameter estimation unit 142. Damping filter unit 12 sets damping filter unit 12 based on these model parameters and the determination result of the presence or absence of vibration.

Figure 3:
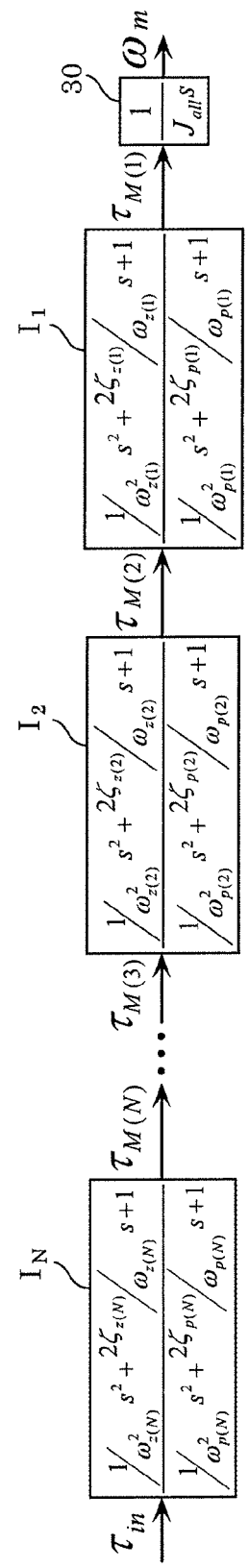
FIG. 3 illustrates a relationship between a torque command and a rotational speed of a model according to the embodiment.

Next, the model of the device including load 4 and motor 2 will be described with reference to FIG. 3. FIG. 3 illustrates a relationship between a torque command and a rotational speed in a model according to the present embodiment. In the present embodiment, an (N+1) inertia system model is used as a model. As illustrated in FIG. 3, the model is represented by rigid-body characteristic portion 30, and vibration characteristic portions from first vibration characteristic portion $I_1$ to N-th vibration characteristic portion $I_N$. Due to the use of the (N+1) inertia system model, FIG. 3 illustrates the vibration characteristic portions from first vibration characteristic portion $I_1$ to N-th vibration characteristic portion $I_N$. For example, in the case where the model is a two-inertia system, the block diagram of only first vibration characteristic portion $I_1$ is illustrated. In the case where the model is a three-inertia system, the block diagram of only first vibration characteristic portion $I_1$ and second vibration characteristic portion 12 are illustrated. In FIG. 3, $\tau_{in}$ is a torque command generated by servo controller 13, and $\omega_m$ is a rotational speed of motor 2 calculated from the output of detector 3. In addition, $J_{all}$ is the total inertia, $\omega_{p(i)}$ is the resonance frequency of i-th vibration characteristic portion $I_i$, $\zeta_{p(i)}$ is the resonance damping ratio of i-th vibration characteristic portion $I_i$, $\omega_{z(i)}$ is the antiresonance frequency of i-th vibration characteristic portion $I_i$, and $\zeta_{z(i)}$ is the antiresonance damping ratio of i-th vibration characteristic portion $I_i$. These parameters are the model parameters estimated by parameter estimation unit 142 according to the present embodiment. Moreover, $\tau_{M(i)}$ is a value calculated from the model parameter estimated as rotational speed $\omega_m$ of motor 2 based on the intermediate torque of i-th vibration characteristic portion $I_i$. When the relationship between rotational speed $\omega_m$ and torque command $\tau_{in}$ is expressed by a transfer function, the following formula (1) is obtained.

[Math 1]

$$\frac{\omega_m}{\tau_m} = \frac{1}{J_{all}s} \prod_{i=1}^{N} \frac{\frac{1}{\omega_{z(i)}^2}s^2 + \frac{2\zeta_{z(i)}}{\omega_{z(i)}}s + 1}{\frac{1}{\omega_{p(i)}^2}s^2 + \frac{2\zeta_{p(i)}}{\omega_{p(i)}}s + 1} \quad (1)$$

Moreover, the relationship between rotational speed $\omega_m$ and intermediate torque $\tau_{M(1)}$ of first inertia system $I_1$, and the relationship between intermediate torque $\tau_{M(i)}$ of i-th inertia system $I_i$ and intermediate torque $\tau_{M(i+1)}$ of (i+1)th inertia system $I_{i+1}$ are expressed by formula (2) and formula (3), respectively.

[Math 2]

$$\frac{\omega_m}{\tau_{M(1)}} = \frac{1}{J_{all}s} \quad (2)$$

[Math 3]

$$\frac{\tau_{M(i)}}{\tau_{M(i+1)}} = \frac{\frac{1}{\omega_{z(i)}^2}s^2 + \frac{2\zeta_{z(i)}}{\omega_{z(i)}}s + 1}{\frac{1}{\omega_{p(i)}^2}s^2 + \frac{2\zeta_{p(i)}}{\omega_{p(i)}}s + 1} \quad (3)$$

Figure 4:
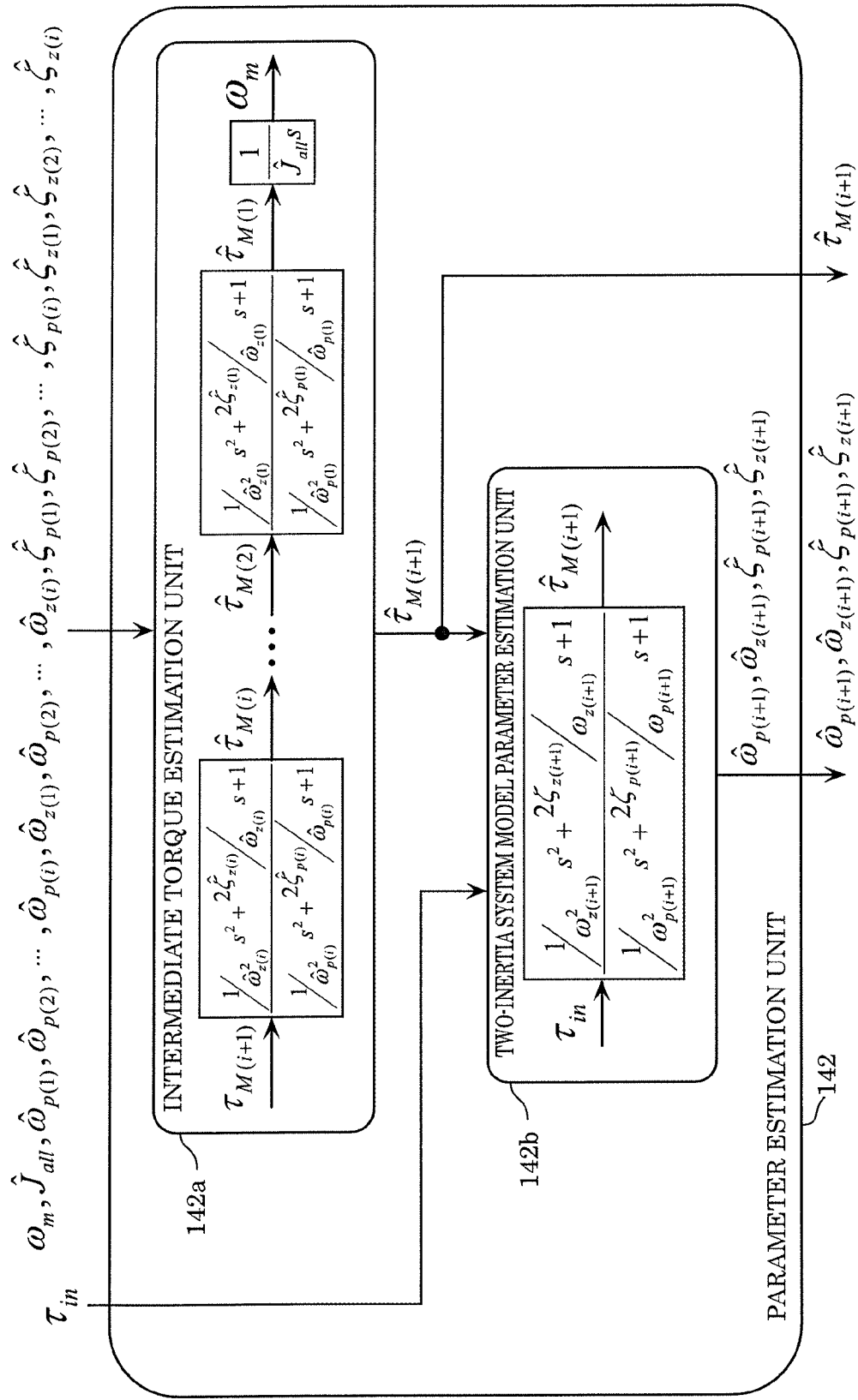
FIG. 4 is a block diagram of a detailed configuration of a parameter estimation unit of the motor drive device according to the embodiment.

Next, parameter estimation unit 142 will be described with reference to FIG. 4. FIG. 4 is a block diagram of a detailed configuration of parameter estimation unit 142 of motor drive device 1 according to the present embodiment. Parameter estimation unit 142 includes intermediate torque estimation unit 142a and two-inertia system model parameter estimation unit 142b, and performs estimation assuming that the model is a two-inertia system.

Intermediate torque estimation unit 142a estimates the intermediate torque by using the rotational speed of motor 2 and the model parameters estimated by parameter estimation unit 142. As illustrated in FIG. 4, to parameter estimation unit 142, rotational speed $\omega_m$ of motor 2, torque command $\tau_{in}$, the model parameters from first vibration characteristic portion $I_1$ to i-th vibration characteristic portion $I_i$ already estimated according to the present embodiment, $$\hat{\omega}_{p(1)}, \hat{\omega}_{p(2)}, \ldots, \hat{\omega}_{p(i)}, \hat{\omega}_{z(1)}, \hat{\omega}_{z(2)}, \ldots, \hat{\omega}_{z(i)}, \hat{\zeta}_{p(1)},$$
$$\hat{\zeta}_{p(2)}, \ldots, \hat{\zeta}_{p(i)}, \hat{\zeta}_{z(1)}, \hat{\zeta}_{z(2)}, \hat{\zeta}_{z(t)}, \quad \text{[Math 4]}$$

and the estimated total inertia $$\hat{J}_{all} \quad \text{[Math 5]}$$

are input. However, when i=0, only rotational speed $\omega_m$ and torque command $\tau_{in}$ are input.

Intermediate torque estimation unit 142a calculates intermediate torque $\tau_{M(i+1)}$ using the relationship of formula (3). Specifically, since rotational speed $\omega_m$ and each estimated model parameter are given, when a filter expressed by the reciprocal of the transfer function of formula (3) is applied to $\tau_{M(i)}$, the estimated value $$\hat{\tau}_{M(i+1)} \quad \text{[Math 6]}$$

of the intermediate torque is obtained. Formula (3) is expressed as a continuous transfer function. In the case of a discrete transfer function, intermediate torque $\tau_{M(i+1)}$ is obtained by applying a digital IIR filter to $\tau_{M(i)}$ by discretizing formula (3) using a bilinear transformation method. Hence, the estimated value of the intermediate torque may be calculated using this relationship.

In two-inertia system model parameter estimation unit 142$b$, it is assumed that the estimated value $$\hat{\tau}_{M(i+1)} \quad \text{[Math 7]}$$

of the intermediate torque and $\tau_{in}$ have a relationship expressed by formula (4) below.

[Math 8]

$$\frac{\hat{\tau}_{M(i+1)}}{\tau_{in}} = \frac{\frac{1}{\omega_{z(i+1)}^2}s^2 + \frac{2\zeta_{z(i+1)}}{\omega_{z(i+1)}}s + 1}{\frac{1}{\omega_{p(i+1)}^2}s^2 + \frac{2\zeta_{p(i+1)}}{\omega_{p(i+1)}}s + 1} \quad (4)$$

With this, model parameters $$\hat{\omega}_{p(i+1)}, \hat{\omega}_{z(i+1)}, \hat{\zeta}_{p(i+1)}, \hat{\zeta}_{z(i+1)} \quad \text{[Math 9]}$$

are estimated.

An example of such a model parameter estimation is the application of a method based on the least square method disclosed in, for example, PTL 2. Since all of the model parameters $$\omega_{p(i+1)}, \omega_{z(i+1)}, \zeta_{p(i+1)}, \zeta_{z(i+1)} \quad \text{[Math 10]}$$

are at least zero, the optimization problem with this condition as a constraint condition expression may be solved using an optimization method such as the steepest descent method. By using this method, as the output of parameter estimation unit 142, the estimation results of model parameters $$\hat{\omega}_{p(i+1)}, \hat{\omega}_{z(i+1)}, \hat{\zeta}_{p(i+1)}, \hat{\omega}_{z(i+1)} \quad \text{[Math 11]}$$

of the +1)th inertia system and intermediate torque $$\hat{\tau}_{M(i+1)} \quad \text{[Math 12]}$$

are obtained.

Note that the assumption expressed by the following formula (5) is used only when i=0.

[Math 13]

$$\frac{\omega_m}{\tau_m} = \frac{1}{J_{all}s} \frac{\frac{1}{\omega_{z(1)}^2}s^2 + \frac{2\zeta_{z(1)}}{\omega_{z(1)}}s + 1}{\frac{1}{\omega_{p(1)}^2}s^2 + \frac{2\zeta_{p(1)}}{\omega_{p(1)}}s + 1} \quad (5)$$

With this, after estimating the model parameters including the total inertia, estimated total inertia $$\hat{J}_{all} \quad \text{[Math 14]}$$

is used so that intermediate torque $$\hat{\tau}_{M(1)} \quad \text{[Math 15]}$$

is estimated. When the total inertia has been separately estimated, the result of the separate estimation may be used.

Figure 5:
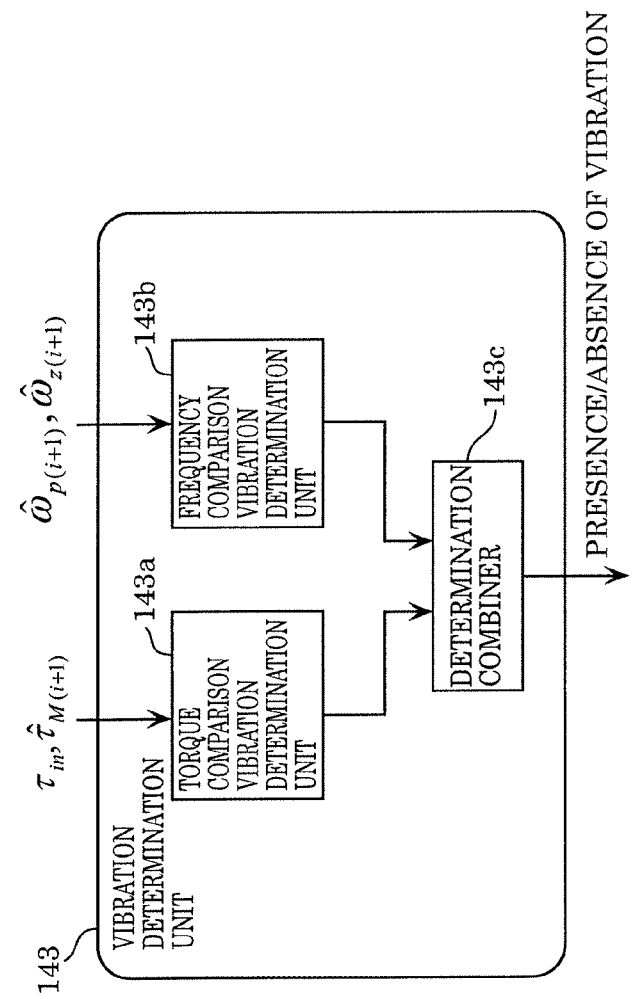
FIG. 5 is a block diagram of a detailed configuration of a vibration determination unit of the motor drive device according to the embodiment.

Next, vibration determination unit 143 will be described. FIG. 5 is a block diagram of a detailed configuration of vibration determination unit 143 of motor drive device 1 according to the present embodiment. As illustrated in FIG. 5, vibration determination unit 143 includes torque comparison vibration determination unit 143$a$, frequency comparison vibration determination unit 143$b$, and determination combiner 143$c$. Vibration determination unit 143 receives intermediate torque $$\hat{\tau}_{M(i+1)}, \quad \text{[Math 16]}$$

estimated as torque command $\tau_{in}$, resonance frequency $$\hat{\tau}_{M(i+1)}, \quad \text{[Math 17]}$$

and antiresonance frequency $$\hat{\omega}_{z(i+1)} \quad \text{[Math 18]}$$

as inputs to determine the presence or absence of vibration, that is, the necessity of the (i+1)th stage damping filter.

Specifically, when the vibration component of the (i+1)th inertia system does not occur, that is, when the (i+1)th stage damping filter is not necessary, intermediate torque $\tau_{M(i+1)}$ and torque command $\tau_{in}$ should substantially coincide with each other. Accordingly, torque comparison vibration determination unit 143$a$ of vibration determination unit 143 determines the absence of the vibration of the (i+1)th inertia system when the maximum value of the difference between the estimated intermediate torque $$\hat{\tau}_{M(i+1)} \quad \text{[Math 19]}$$

and $\tau_{in}$ is less than or equal to a predetermined value, and performs output indicating that the (i+1)th stage damping filter is not necessary. Here, when vibration determination is performed, the average value or the median value of the difference may be used.

Moreover, the characteristic in which the ratio of the resonance frequency to the antiresonance frequency value is 1 is the characteristic indicated by the rigid-body model. Since vibration does not occur in the rigid-body model, frequency comparison vibration determination unit 143$b$ determines that vibration is absent when the ratio $$\hat{\omega}_{z(i+1)}/\hat{\omega}_{p(i+1)} \quad \text{[Math 20]}$$

is greater than or equal to a threshold value.

Determination combiner 143$c$ combines the determination results of torque comparison vibration determination unit 143$a$ and frequency comparison vibration determination unit 143$b$, and finally determines the necessity of the (i+1)th stage damping filter. The combining of the determination performed by determination combiner 143$c$ may be a logical sum or a logical product of both the determination results.

Figure 6:
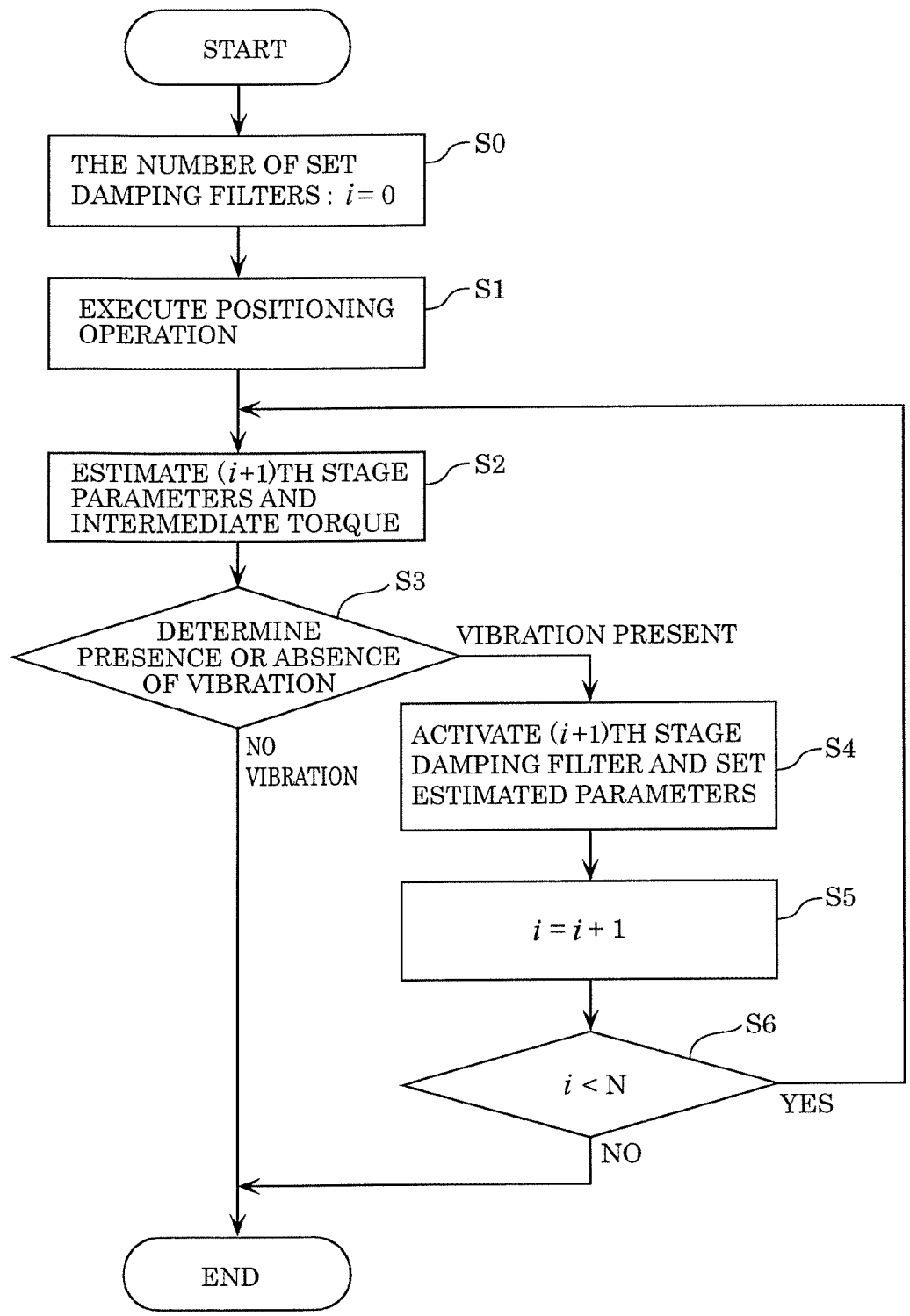
FIG. 6 is a flowchart of a servo adjustment method according to the embodiment.

Next, a servo adjustment method performed by motor drive device 1 according to the present embodiment will be described with reference to FIG. 6. FIG. 6 is a flowchart of a servo adjustment method according to the present embodiment. Variable i in FIG. 6 indicates the number of stages of the damping filters already been set at the time of processing.

As illustrated in FIG. 6, first, the number i of set damping filters is set to 0 (S0).

Next, in step S1, a load positioning operation is performed based on the position command generated by position command generator 11. Here, a position command is actually output from position command generator 11 to drive motor 2. Damping filter setting unit 14 stores, in time sequence, torque command $\tau_{in}$ output from servo controller 13 at this time and rotational speed $\omega_m$ of the motor calculated from the output of detector 3.

Figure 7:
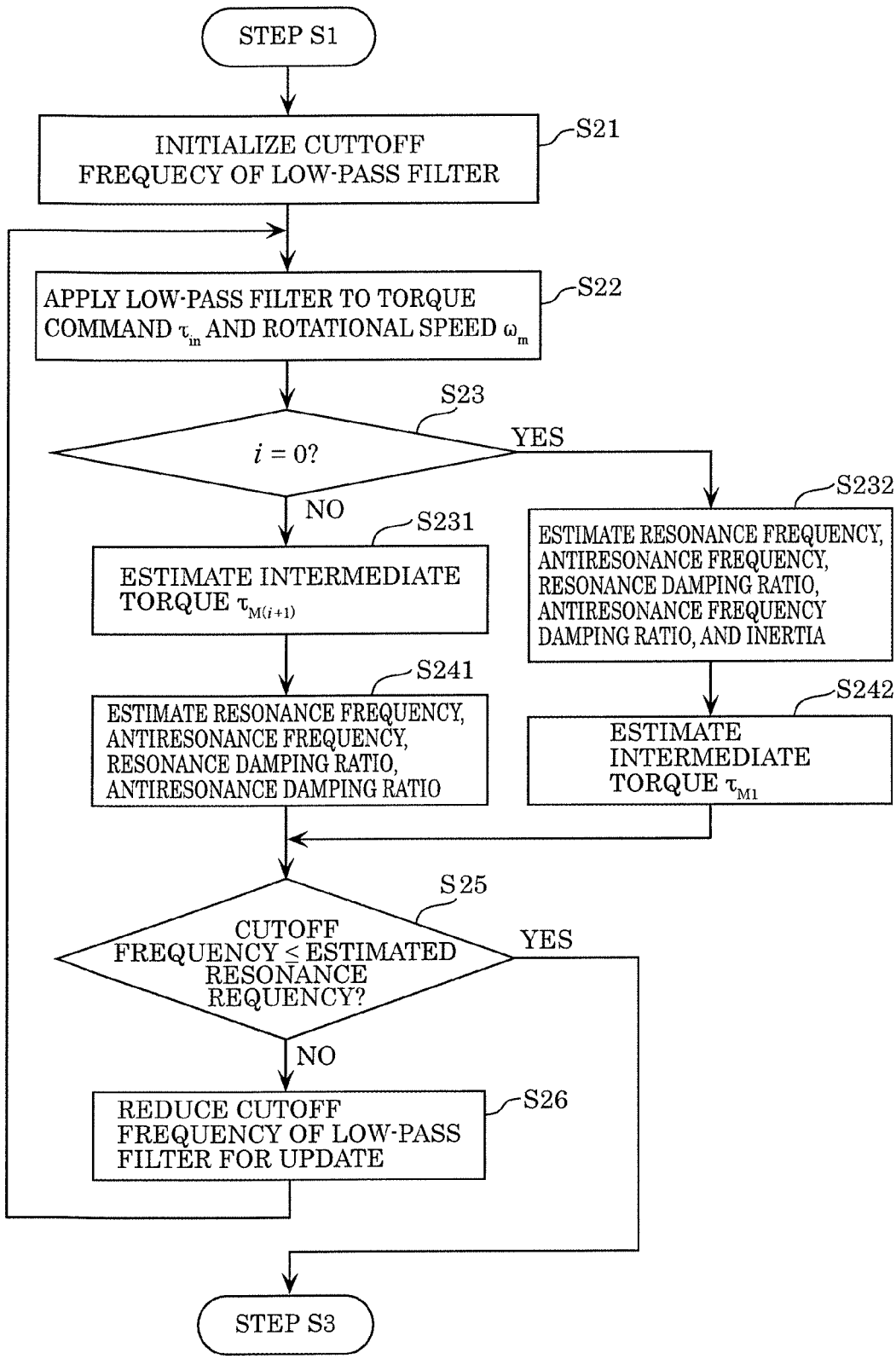
FIG. 7 is a flowchart of a method of estimating a model parameter and an intermediate torque according to the embodiment.

Next, in step S2, assuming that the model is a two-inertia system, model parameters are estimated from rotational speed $\omega_m$ of motor 2 and torque command $\tau_{in}$ to which the low-pass filter has been applied. In step S2, the intermediate torque is estimated using rotational speed $\Omega_m$ of motor 2 and the model parameters estimated in this step. In this step, the model parameters are estimated assuming that the model is a two-inertia system. However, even if the model is actually a higher order inertia system, such as a third-order or a fourth-order inertia system, it is necessary to remove the influence of the high-frequency vibration component to keep only the low-frequency components to be estimated, so that the model parameters are accurately estimated. For this reason, the low-pass filter of low-pass filter unit 141 is applied to rotational speed $\omega_m$ and torque command $\tau_{in}$ to remove the high-frequency components. However, since the resonance frequency and antiresonance frequency to be estimated are unknown, the cutoff frequency of the low-pass filter cannot be uniquely determined. Therefore, in the present embodiment, the cutoff frequency of the low-pass filter is gradually reduced, and the model parameters are estimated each time. The estimated value obtained when the estimated resonance frequency is greater than the cutoff frequency is used as a model parameter estimation result. A specific method of step S2 will be described with reference to FIG. 7. FIG. 7 is a flowchart of a method of estimating the model parameters and the intermediate torque according to the present embodiment.

As illustrated in FIG. 7, in step S21, the cutoff frequency of the low-pass filter is initialized. Here, the largest possible initial value of the cutoff frequency is set. For example, the initial value of the cutoff frequency may be the maximum value that can be set as the damping frequency of motor drive device 1.

Next, in step S22, a low-pass filter with a specified cutoff frequency is applied to rotational speed $\omega_m$ and torque command $\tau_{in}$ to obtain rotational speed $\omega_m'$ and torque command $\tau_{in}'$ to which the low-pass filter has been applied. Subsequently, rotational speed $\omega_m'$ and torque command $\tau_{in}'$ are input to parameter estimation unit 142 to obtain an estimation result of the intermediate torque of each model parameter.

Next, in step S23, whether or not variable i is 0 is determined. When i is not 0 (No in S23), the intermediate torque is estimated in step S231, and the model parameters (resonance frequency, antiresonance frequency, resonance attenuation ratio, antiresonance attenuation ratio) are estimated in step S241 based on the estimation result. On the other hand, when i=0 (Yes in S23), the model parameters are estimated in step S232, and the intermediate torque is estimated in step S242 from the estimation result.

Next, in step S25, the cutoff frequency of the low-pass filter and the estimated resonance frequency $$\hat{\omega}_{p(i+1)} \quad [\text{Math 21}]$$

are compared with each other. When the cutoff frequency is greater than the resonance frequency (No in S25), the cutoff frequency is reduced for update in step S26, and the process returns to step S22. The step of estimating the model parameters and step S26 are repeated. When the cutoff frequency is less than or equal to the estimated resonance frequency (Yes in S25), step S2 is terminated, and parameter estimation unit 142 outputs the model parameters and the intermediate torque estimated at that time. As described above, in the present embodiment, since the frequency components higher than the resonance frequency can be removed from rotational speed $\omega_m$ and torque command $\tau_{in}$ to the maximum extent, the model parameters can be accurately estimated.

Referring back to FIG. 6, in step S3, the presence or absence of vibration of the vibration component of the (i+1)th inertia system in the model is determined. Specifically, the presence or absence of vibration in the model is determined by using the intermediate torque, the torque command, and the estimated model parameters. In the present embodiment, the presence or absence of vibration is determined by vibration determination unit 143 from torque command $\tau_{in}$, the intermediate torque output in step S2, the resonance frequency, and the antiresonance frequency.

When it is determined in step S3 that no vibration component of the (i+1)th inertia system is present (no vibration in step S3), the process is terminated without setting the (i+1)th stage damping filter. When it is determined in step S3 that the vibration component of the (i+1)th inertia system is present (vibration is present in S3), the process proceeds to step S4.

In step S4, the (i+1)th stage damping filter is activated and the estimated model parameters $$\hat{\omega}_{p(i+1)}, \hat{\zeta}_{p(i+1)}, \hat{\omega}_{z(i+1)}, \hat{\zeta}_{z(i+1)} \quad [\text{Math 22}]$$

are set for the (i+1)th damping filter.

In step S5, variable i indicating the number of set damping filters is updated to i+1. Subsequently, in step S6, it is determined whether or not variable i is less than the number of stages N of damping filters mounted in motor drive device 1. When variable i is less than the number of stages N (Yes in S6), the process returns to step S2. On the other hand, when variable i is greater than or equal to the number of stages N (No in S6), the process is terminated.

In this way, the process of determining the presence or absence of vibration from the relationship between torque command $\tau_{in}$ and intermediate torque $\tau_M$, and determining the necessity of the damping filters is repeated. By doing so, the model parameters to be set to each damping filter can be estimated at the same time as determining the necessary number of stages of the damping filters.

As described above, in motor drive device 1 according to the present embodiment, model parameters corresponding to the model of the device including load 4 and motor 2 can be estimated. Moreover, by using the estimated model parameters and the torque command to determine the presence or absence of vibration, the number of stages of the damping filters necessary for the model can be determined. Moreover, the model parameters can be accurately estimated by low-pass filter unit 141 removing the high-frequency components of the signal input to the parameter estimation unit. Moreover, use of the model parameters accurately estimated allows the damping filters to precisely function.

In addition, use of the intermediate torque, the torque command, and the model parameters to determine the presence or absence of vibration leads to accurate determination of the presence or absence of vibration.

As described above, motor drive device 1 according to the present embodiment is motor drive device 1 which drives motor 2 to which load 4 is connected. Motor drive device 1 includes: position command generator 11 which generates a position command corresponding to the target position of motor 2; damping filter unit 12 which includes one or more stages of damping filters which reduce vibration of a device including load 4 and a motor, applies, to the position command, the damping filter determined from among the one or more stages of the damping filters based on the model parameters corresponding to the model of the device, and outputs the filtered position command to which the damping filter has been applied; servo controller 13 which gives a torque command to motor 2 based on the filtered position command; low-pass filter unit 141 which removes the frequency components higher than or equal to a predetermined cutoff frequency; parameter estimation unit 142 which estimates the model parameters from the rotational speed of motor 2 and the torque command which have passed through low-pass filter unit 141; and vibration determination unit 143 which determines presence or absence of vibration in the device.

With this, model parameters corresponding to the model of the device including load 4 and motor 2 can be estimated. Moreover, by using the estimated model parameters and the torque command to determine the presence or absence of vibration, the number of stages of the damping filters necessary for the model can be determined. Moreover, the model parameters can be accurately estimated by using low-pass filter unit 141 to remove the high-frequency components of the signal input to parameter estimation unit 142. Additionally, use of the model parameters accurately estimated allows the damping filters to precisely function.

Moreover, in one aspect of motor drive device 1 according to the present embodiment, it may be that parameter estimation unit 142 includes intermediate torque estimation unit 142a which estimates the intermediate torque using the rotational speed of motor 2 and the model parameters estimated by parameter estimation unit 142, and that vibration determination unit 143 determines the presence or absence of vibration in the model using the intermediate torque, the torque command, and the model parameters estimated by parameter estimation unit 142.

As described above, use of the intermediate torque, the torque command, and the model parameters leads to accurate determination of the presence or absence of vibration.

The servo adjustment method according to the present embodiment is a servo adjustment method of motor drive device 1 which drives motor 2 to which load 4 is connected. Motor drive device 1 includes: position command generator 11 which generates a position command corresponding to the target position of motor 2; damping filter unit 12 which includes one or more stages of damping filters which reduce vibration of a device including load 4 and motor 2, applies a damping filter determined from among the one or more stages of the damping filters based on a model parameter corresponding to the model of the device, and outputs a filtered position command to which the damping filter has been applied; and servo controller 13 which gives a torque command to motor 2 based on the filtered position command. The servo adjustment method includes: positioning load 4 based on the position command generated by position command generator 11, when i stage of damping filter among the one or more stages of the damping filters is set, i being greater than or equal to 0; estimating the model parameter from a rotational speed of motor 2 and the torque command to which a low-pass filter has been applied, assuming that the model is a two-inertia system; determining presence or absence of a vibration component of an (i+1)th inertia system in the model; and activating an (i+1)th stage damping filter and setting the model parameter estimated, when the vibration component of the (i+1)th inertia system has been determined to be present in the determining. The estimating, the determining, and the setting are repeated till the vibration component is determined to be absent in the determining.

With this, model parameters corresponding to the model of the device including load 4 and motor 2 can be estimated. Moreover, by using the estimated model parameters and the torque command to determine the presence or absence of vibration, the number of stages of the damping filters necessary for the model can be determined. Moreover, by applying a low-pass filter to remove the high-frequency components of the rotational speed of motor 2 and the torque command, the model parameters can be accurately estimated. Additionally, use of the model parameters accurately estimated allows the damping filters to precisely function.

Moreover, in the servo adjustment method according to the present embodiment, it may be that an intermediate torque is estimated by using the rotational speed of motor 2 and the model parameter estimated in the estimating, and in the determining, the presence or the absence of the vibration in the model is determined by using the intermediate torque, the torque command, and the model parameter estimated in the estimating.

Use of the intermediate torque, the torque command, and the model parameters as described above leads to accurate determination of the presence or absence of vibration.

Moreover, it may be that the servo adjustment method according to the present disclosure includes reducing a cutoff frequency of the low-pass filter, and that the estimating and the reducing are repeated, and the model parameter estimated when the cutoff frequency is lower than or equal to a resonance frequency of the model estimated in the estimating is applied to the (i+1)th stage damping filter.

With this, the model parameters can be estimated accurately because the frequency components higher than the resonance frequency can be removed to the maximum extent.

(Variations, Etc.)

As described above, the motor drive device and the servo adjustment method according to the present disclosure have been described based on the embodiment. However, the present disclosure is not limited to such an embodiment.

The model parameter estimation method described in the present disclosure is implemented in the motor drive device within the servo. However, the model parameter estimation method may be implemented in another device, such as a personal computer or a console provided with corresponding communication means, via a communication interface (RS232, RS485, USB communication, Ethernet connection, Bluetooth (registered trademark) communication, wireless connection means such as wireless LAN, etc.) included in motor drive device 1 and not illustrated. Moreover, even if all the functions of the parameter estimation unit are incorporated in motor drive device 1, the advantageous effects of the present disclosure are not prevented.

Moreover, each structural element of motor drive device 1 according to the present disclosure may be configured by dedicated hardware or may be realized by executing a software program suitable for each structural element. Each structural element may be realized by a program execution unit, such as a central processing unit (CPU) or a processor, reading and executing a software program recorded on a recording medium, such as a hard disk or a semiconductor memory.

In addition, a form obtained by making various modifications conceivable by those skilled in the art to the embodiment, and a form realized by arbitrarily combining the structural elements and functions in the embodiment without departing from the gist of the present disclosure are also included in the present disclosure.

INDUSTRIAL APPLICABILITY

The motor drive device according to the present disclosure provides a means which allows even an operator who does not have detailed knowledge of the device or servo to obtain the model parameters of the device and the appropriate number of stages of damping filters from the positioning operation. For this reason, the motor drive device and the servo adjustment method according to the present disclosure are particularly useful in an industrial apparatus, such as a semiconductor manufacturing device and a machine tool, which is required to reduce vibration in a positioning operation.

The invention claimed is:

1. A motor drive device which drives a motor to which a load is connected, the motor drive device comprising:
a damping filter unit which includes one or more stages of damping filters, the damping filter unit applying, to a position command corresponding to a target position of the motor, a damping filter determined from among the one or more stages of the damping filters based on a model parameter corresponding to a model of a first device including the load and the motor, and outputting a filtered position command to which the damping filter has been applied, the one or more stages of the damping filters reducing vibration of the first device;
a servo controller which gives a first torque command to the motor based on the filtered position command;
a low-pass filter unit which generates:
a second signal indicating a rotational speed of the motor by removing a frequency component higher than or equal to a predetermined cutoff frequency from a rotational speed of the motor calculated from a first signal indicating a position of the motor detected by a detector that detects a position of the motor; and
a second torque command by removing the frequency component higher than or equal to the predetermined cutoff frequency from the first torque command output from the servo controller;
a parameter estimation unit into which the second signal and the second torque command both filtered by the low-pass filter unit are input, and which estimates the model parameter from the second signal and the second torque command; and
a vibration determination unit which determines presence or absence of vibration in the device.

2. The motor drive device according to claim 1, wherein the vibration determination unit determines the presence or the absence of the vibration in the model by using the second torque command and the model parameter.

3. A servo adjustment method performed by a motor drive device which drives a motor to which a load is connected, wherein the motor drive device includes:
a damping filter unit which includes one or more stages of damping filters, the damping filter unit applying, to a position command corresponding to a target position of the motor, a damping filter determined from among the one or more stages of the damping filters based on a model parameter corresponding to a model of a first device including the load and the motor, and outputting a filtered position command to which the damping filter has been applied, the one or more stages of the damping filters reducing vibration of the first device; and
a servo controller which gives a first torque command to the motor based on the filtered position command,
the servo adjustment method, comprising:
positioning the load based on the position command, when i stage of damping filter among the one or more stages of the damping filters is set, i being greater than or equal to 0;
filtering to generate (i) a second signal indicating a rotational speed of the motor by removing a frequency component higher than or equal to a predetermined cutoff frequency from a rotational speed of the motor calculated from a first signal indicating a position of the motor detected by a detector that detects a position of the motor, and (ii) a second torque command by removing the frequency component higher than or equal to the predetermined cutoff frequency from the first torque command output from the servo controller;
estimating the model parameter from the second signal and the second torque command both filtered in the filtering;
determining presence or absence of a vibration component of an (i+1)th inertia system in the model; and
activating an (i+1)th stage damping filter and setting the model parameter estimated, when the vibration component of the (i+1)th inertia system has been determined to be present in the determining,
wherein the estimating, the determining, and the setting are repeated till the vibration component is determined to be absent in the determining.

4. The servo adjustment method according to claim 3, wherein in the determining, the presence or the absence of the vibration in the model is determined by using the second torque command and the model parameter.

5. The servo adjustment method according to claim 3, further comprising:
reducing a cutoff frequency of the low-pass filter,
wherein the estimating and the reducing are repeated, and the model parameter estimated when the cutoff frequency is lower than or equal to a resonance frequency of the model estimated in the estimating is applied to the (i+1)th stage damping filter.

6. The servo adjustment method according to claim 4, wherein, in the estimating, an intermediate torque is estimated by using the rotational speed of the motor and the model parameter, and
in the determining, the presence or absence of the vibration in the model is determined by using the intermediate torque, the second torque command, and the model parameter estimated in the estimating.

7. The servo adjustment method according to claim 1, wherein the parameter estimation unit includes an intermediate torque estimation unit which estimates an intermediate torque by using the rotational speed of the motor and the model parameter, and
the vibration determination unit determines the presence or absence of the vibration in the model by using the intermediate torque, the second torque command, and the model parameter.

8. The servo adjustment method according to claim 1, further comprising a position command generator which generates the position command.

* * * * *